United States Patent
Reilly, Jr. et al.

(10) Patent No.: US 6,174,445 B1
(45) Date of Patent: Jan. 16, 2001

(54) TREATMENT OF WATER WITH POLYNUCLEATE METAL HYDROXIDE COMPOUNDS

(75) Inventors: Phillip B. Reilly, Jr.; P. Brennan Reilly, III, both of Mountain Lakes, NJ (US)

(73) Assignee: BR Technologies, Lake Hopatcony, NJ (US)

(*) Notice: Under 35 U.S.C. 154(b), the term of this patent shall be extended for 0 days.

(21) Appl. No.: 09/373,276

(22) Filed: Aug. 12, 1999

Related U.S. Application Data

(62) Division of application No. 08/873,295, filed on Jun. 11, 1997, now Pat. No. 5,938,970.

(51) Int. Cl.⁷ .................................. C02F 1/52
(52) U.S. Cl. .................. 210/716; 210/728; 210/906; 210/928
(58) Field of Search .................... 210/702, 716, 210/723, 728, 747, 906, 928; 252/175; 423/514, 554, 556, 594

(56) References Cited

U.S. PATENT DOCUMENTS

| | | | |
|---|---|---|---|
| 3,544,476 | 12/1970 | Aiba et al. | 252/175 |
| 3,764,524 * | 10/1973 | Stankewich | 210/631 |
| 3,879,525 * | 4/1975 | Miyata et al. | 423/518 X |
| 3,909,439 | 9/1975 | Rivola et al. | |
| 4,082,685 | 4/1978 | Notari et al. | |
| 4,252,735 | 2/1981 | Layer et al. | 423/265 X |
| 4,284,611 | 8/1981 | Gancy et al. | 423/308 |
| 4,362,643 * | 12/1982 | Kuo et al. | 252/175 |
| 4,536,384 | 8/1985 | Lindahl | 423/556 |
| 4,563,342 * | 1/1986 | Gunnarsson et al. | 423/556 |
| 4,566,986 * | 1/1986 | Waldmann | 423/556 X |
| 4,629,626 * | 12/1986 | Miyata et al. | 423/554 X |
| 4,661,282 * | 4/1987 | Clark | 252/175 X |
| 4,814,106 * | 3/1989 | Kvant | 252/175 X |
| 4,877,597 | 10/1989 | Haase et al. | 423/556 |
| 4,981,675 | 1/1991 | Haase et al. | 423/556 |
| 5,069,893 | 12/1991 | Haase et al. | 423/556 |
| 5,149,400 | 9/1992 | Haase et al. | 423/556 X |
| 5,348,721 * | 9/1994 | Murphy et al. | 423/556 X |
| 5,474,703 * | 12/1995 | Ritter | 252/181 |

FOREIGN PATENT DOCUMENTS

| | | |
|---|---|---|
| 1123306 | 5/1982 | (CA). |
| 1203364 | 4/1986 | (CA). |
| 1203664 | 4/1986 | (CA). |
| 1203665 | 4/1996 | (CA). |

* cited by examiner

Primary Examiner—Peter A. Hruskoci
(74) Attorney, Agent, or Firm—BR Technologies

(57) ABSTRACT

Polynucleate metal hydroxide anionic compounds and method for their production. The compounds have the formula:

$$M_a N_b (OH)_c X_d Y_e Z_f (H_2O)_g$$

wherein

M is a tri- or more valent metal ion;

N is a divalent metal ion that forms a soluble salt with anions X, Y or Z;

OH represents the level of basicity;

X is a monovalent anion;

Y is a divalent anion;

Z is a trivalent anion;

a is 1;

b is from 0.15 to 2.0;

c is from 0.3 to 5;

d is from 0 to 3;

e is from 0.1 to 2.25;

f is from 0 to 1; and g is greater than 4 where the compound is in the form of an aqueous solution, or from 0 to 20 where the compound is not in the form of an aqueous solution. The compounds are useful for water treatment for removal of suspended solids and for various applications in the paper industry.

5 Claims, No Drawings

TREATMENT OF WATER WITH POLYNUCLEATE METAL HYDROXIDE COMPOUNDS

This is a divisional of application Ser. No. 08/873,295, filed Jun. 11, 1997 now Pat. No. 5,938,970.

BACKGROUND OF THE INVENTION

1. Field of the Invention

The invention relates to a new group of inorganic water-soluble polynucleate compounds containing at least two different metals, a trivalent metal and a divalent metal, where both the trivalent metal and the divalent metal form soluble salts with an associated divalent anion.

2. Description of Related Art

Aluminum sulfate has been the traditional chemical used in various water and wastewater treatment and paper processing applications. These include but are not limited to:

- clarification of surface water to remove suspended solids, color and bacteria, making the water safe for human consumption or industrial use;
- clarification of municipal and industrial wastewaters to remove suspended solids, BOD, COD, phosphates and oils;
- retention of fibers and fillers in the production of paper;
- sizing of paper to make it hydrophobic; and
- control of pitch in the production of paper.

Aluminum sulfate is generally produced by reacting alumina trihydrate (ATH) —$Al_2O_3.(3H_2O)$— with sulfuric acid in an acid resistant digester. Bauxite containing gibbsite ($Al_2O_3.3H_2O$) is also used as a low cost raw material for supply of aluminum sulfate.

Aluminum sulfate is normally supplied as a liquid solution containing 48.5% $Al_2(SO_4)_3.(14.3\ H_2O)$. It may also be supplied as a dry product which is dissolved in water prior to use.

Ferric sulfate and other iron salts have begun to replace aluminum sulfate in many of the water and wastewater treatment applications, especially phosphate removal. Ferric sulfate reacts with suspended solids in a manner similar to aluminum sulfate but is generally less expensive. It is made by reacting ferric oxide with sulfuric acid; in several of the processes presently being used, pressure is needed to complete the reaction.

In the 1970's, a new class of inorganic polyelectrolytes started to replace aluminum sulfate. The first products that showed promise were poly aluminum sulfates. Processes for the production of poly aluminum sulfates are disclosed in U.S. Pat. Nos. 4,284,611 and 4,536,665 and Canadian Patents Nos. 1,123,306, 1,203,364, 1,203,664, and 1,203,665.

In these patents, poly aluminum sulfate is produced by reacting aluminum sulfate solutions with sodium carbonate or sodium hydroxide to form an insoluble aluminum hydroxide gel, and soluble sodium sulfate which is washed out of the gel. The gel is then redispersed in a fresh aluminum sulfate solution and reacted at elevated temperatures. The gel redissolves, basifying the aluminum sulfate making a poly aluminum sulfate (PAS).

These reactions may be summarized as follows:

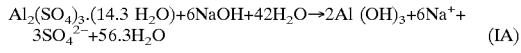

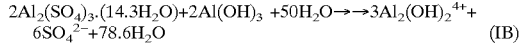

Poly aluminum sulfate solutions with basicities greater than about 15% made using this procedure have exhibited stability problems. Some of the solutions would be stable for several months where others were only stable for days. This stability problem was never resolved and this technology never reached full commercialization.

U.S. Pat. No. 4,877,597 describes another process for the production of poly aluminum sulfate. This process eliminated the initial step of producing an aluminum hydroxide gel by reacting aluminum sulfate with sodium aluminate:

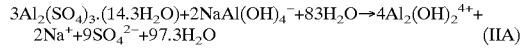

This reaction results in the preparation of a 33% basic poly aluminum sulfate, although other basicities can be prepared using this procedure. This very reaction is sensitive to temperature, reaction and mixing conditions, and it is difficult to produce products that are stable above 33% basic. Basicities in the 20% to 25% range are more stable.

U.S. Pat. No. 3,544,476 discloses a process for formation of a poly aluminum chloro sulfate (PACS). It is prepared by first producing an aluminum chloride/aluminum sulfate solution and then basifying this solution with calcium carbonate or lime. PACS is formed and calcium sulfate precipitates. The insoluble calcium sulfate is removed, generating a clear, stable poly aluminum chloro sulfate solution with a basicity of 50% and an $Al_2O_3$ concentration of 10%.

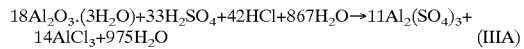

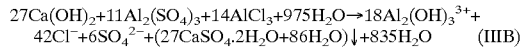

This process produces a stable solution and the resulting product is an effective coagulant. PACS has proven its effectiveness by replacing alum in several applications.

U.S. Pat. Nos. 3,909,439 and 4,082,685 disclose a process for producing poly aluminum chloride (PAC). This process involves reacting alumina tryhydrate with hydrochloric acid under high temperature and pressure conditions.

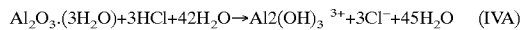

This process produces a stable product at basicities up to 66% and $Al_2O_3$ concentrations up to 18%. The most common product sold is 50% basic and 10% $Al_2O_3$.

Another poly metal salt that has proven an effective product is aluminum chloro hydrate (ACH). It is prepared by reacting aluminum metal with either hydrochloric acid or aluminum chloride.

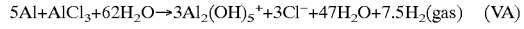

This process produces a stable product at basicities up to 83% and $Al_2O_3$ concentrations up to 24%. The most common product sold is 70% basic at 23% $Al_2O_3$.

U.S. Pat. Nos. 4,981,675, 5,069,893, and 5,149,400 disclose various processes for producing poly aluminum silica sulfate (PASS). In these processes, aluminum sulfate is reacted with an alkali metal silicate and alkali aluminate in an aqueous solution under high shear mixing conditions. The following reaction is typical:

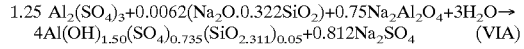

Products made using this reaction generally have a basicity of 50% and an $Al_2O_3$ equivalent concentration of 8.3%, althought products with basicities ranging from 25% to 66% can be made using this technology.

SUMMARY OF THE INVENTION

It is an object of the invention to provide products which perform equal to or better than aluminum sulfate, PAC, PACS, ferric sulfate, ACH and other inorganic coagulants and flocculants.

It is a further object of the invention to provide products which are relatively easy to prepare compared to other inorganic coagulants and flocculants, and less expensive.

It is an additional object of the invention to provide products which can be prepared in an acid resistant tank with standard mixing, without the use of pressure vessels, special high shear mixing or heat to sustain the reaction.

To achieve these and other objects, the invention provides a basic polynucleate metal hydroxide anionic (PMOA) compound containing at least two metals where one is tri- or more valent and the other is divalent, and the associated anions comprise at least one divalent anion. These compounds have an average composition of:

$$M_a N_b (OH)_c X_d Y_e Z_f (H_2O)_g$$

wherein

M is a tri- or more valent metal ion, for example aluminum, iron, chromium or zirconium;

N is a divalent metal ion that forms a soluble salt with anions X, Y or Z, for example magnesium, zinc or copper;

OH represents the level of basicity;

X is a monovalent anion, for example chloride, bromide, acetate or nitrate;

Y is a divalent anion, for example as sulfate, selenate or oxalate;

Z is a trivalent anion, for example phosphate or borate;

a is 1;

b is from 0.15 to 2.0;

c is from 0.3 to 5;

d is from 0 to 3;

e is from 0.1 to 2.25;

f is from 0 to 1;and g is greater than 4 where the product is an aqueous solution, or from 0 to 20 where the product is not an aqueous solution.

Other mono- and divalent metals may be present in this PMOA compound up to 15% of the molarity of the trivalent ion M. These metals may include sodium, potassium, calcium and barium.

The basicity of aqueous forms of the compound generally falls in the range of 15% to 60%. Typical basicities are in the 25% to 45% range.

As used in this specification, basicity is defined as [OH]/(3[M]+2[N]), where M is a trivalent metal and N is a divalent metal. If a +4 valence metal M1 is used, the basicity formula is [OH]/(4[M1]+3[M2]+2[N]), M2 being the trivalent metal. Molar concentrations are used in this formula.

Also within the scope of this invention is a process for producing the PMOA compound. This process comprises reacting a trivalent metal salt solution, for example aluminum sulfate, ferric sulfate, aluminum selenate, chromic sulfate or zirconium sulfate, with a divalent metal, metal oxide, metal carbonate, metal hydroxide, metal aluminate or other divalent metal alkaline material, for example magnesium metal, magnesium oxide, magnesium hydroxide, magnesium carbonate, zinc oxide, zinc metal or cupric oxide. In this reaction, the divalent alkaline metal is added to the tri- or more valent metal salt solution.

Also within the scope of this invention is the use of the PMOA product in a flocculating/coagulating/precipitating treatment for suspended or dissolved solids in an aqueous system, including treatment of waste water and removal of phosphate and algae from lake water and the use of these compounds in the production of paper as retention and drainage aids, for sizing paper and controlling pitch.

DETAILED DESCRIPTION OF THE INVENTION

The PMOA products of the invention are unique compared to other poly metal hydroxide compounds in that they incorporate the basifying (divalent) metal into the final product, there are at least two metals built into the product and there is little or no precipitate resulting from the addition of the basifying metal.

The compounds of the invention are formed by reacting an aqueous solution of a tri- or greater valent metal with a basic solution or suspension of a divalent metal.

As the trivalent metal, aluminum is preferred. Other trivalent metals, such as antimony, cerium, chromium, cobalt, indium, iron, lanthanum and rhodium can also be used.

Of the metals of valency greater than-3, zirconium, cobalt and tin are most often used, but platinum, plutonium and uranium may also be mentioned.

As the divalent metal, magnesium is preferred. Other divalent metals which may be used include beryllium, cadmium, cobalt, copper, indium, iron, nickel, platinum, tin and zinc.

The tri- or greater valent metal will generally be supplied as a solution with a divalent anion, sulfate, oxalate, and borate being most common. However, sulfite, sulfide, selenate, selenite, silicate, silicofluoride, molybdate, citrate and dichromate salts may also be used.

Monovalent and trivalent anions may also be present, including phosphate, borate and oxychloride.

The divalent metal is generally added as a suspension of the oxide, hydroxide, carbonate or aluminate.

It is also possible to add either metal in metallic form, allowing oxidation to occur in situ in the reactor.

The concentration of the starting tri- or greater valent metal solution can vary within a wide range but is generally fairly concentrated, i.e. just below saturation. The solution is supplied at a temperature of less than 150°F. (65.5° C.). The divalent metal oxide suspension is added in a stoichiometric amount over a period of 10 to 60 minutes with stirring. The temperature of the suspension must be high enough to result in a reaction with the solution, and it may be necessary to heat the suspension to over 100° F. (37.8° C.) for this purpose. The temperature of the mixture will increase by 10 to 40° F. (5.6 to 22.2° C.) during the reaction.

In industrial environments, increase of the temperature of either the solution or the suspension can be accomplished by injecting steam into the reactor or with a heat exchanger.

The reaction will take 1 to 6 hours to go to completion, at which time the reaction product should be filtered to remove insolubles, including any unreacted suspension. Dilution water, needed to adjust the final product to a desired concentration, can be added before or after filtration.

The final product is tested to determine specific gravity, metal oxide content, basicity and pH.

The proper combination of tri- and divalent metals in the compound results in products with excellent stability and end use performance. The following examples are examples of stable products prepared based on this invention. All proportions are by weight, unless otherwise noted.

EXAMPLE 1

To a 1,500 ml glass beaker, were added 590 parts of poly aluminum chloride (41% basic containing 10.6% $Al_2O_3$) diluted with 225 parts of water to lower % $Al_2O_3$ to below 8.3%. Next were added 130 parts of aqueous aluminum sulfate solution (containing 8.3% $Al_2O_3$). The mixture was heated to approximately 100° C. for three hours and then cooled to 25° C.

To a second 250 ml glass beaker were added 25 parts of magnesium oxide (containing 98.5+% MgO) slurried with 30 parts of water. The magnesium oxide slurry was then added to the first beaker with stirring over a fifteen minute period. This mixture was stirred for another four hours and then filtered to remove unreacted or otherwise precipitated materials.

A reaction took place according to the following formula: (Poly MACS 7.1CS—50% Basic)

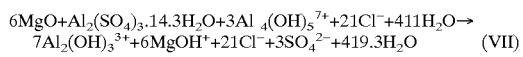

$$6MgO+Al_2(SO_4)_3 \cdot 14.3H_2O+3Al_4(OH)_5{}^{7+}+21Cl^-+411H_2O \rightarrow 7Al_2(OH)_3{}^{3+}+6MgOH^++21Cl^-+3SO_4{}^{2-}+419.3H_2O \quad (VII)$$

When preparing this 50% basic solution, the numerical values for the variables were a=1, b=0.44, c=1.9, d=1.5, e=0.2, f=0 and g>3. The composition of the resulting solution was as follows:

$Al_2O_3$: 7.32%
MgO: 2.48%
Cl: 7.61%
$SO_4$: 3.05%
Mg/Al: 0.43 (molar ratio), 0.38 (weight ratio)
Cl/$SO_4$: 6.90 (molar ratio), 2.49 (weight ratio)
Basicity: 48.7%

EXAMPLE 2

To a 1,500 ml glass beaker, 760 parts of aluminum sulfate (containing 8.3% $Al_2O_3$) were added and diluted with 155 parts water. The mixture was stirred for thirty minutes. To a second 250 ml glass beaker were added 38 parts magnesium oxide (containing 98.5+% MgO), slurried with 47 parts of water. This slurried mixture was then added to the stirred diluted aluminum sulfate over fifteen minutes. The mixture was continuously stirred for four hours and then filtered.

A reaction took place according to the following formula: (Poly MAS—33% Basic)

$$3MgO+Al_2(SO_4)_3 \cdot 14.3H_2O+109H_2O \rightarrow 2Al_2(OH)_2{}^{4+}+Mg_3(OH)_2{}^{4+}+6SO_4{}^{2-}+134.6H_2O \quad (VIII)$$

In this 33% basic solution, the numerical values were a=1, b=0.75, c=1.5, d=0, e=1.5, f=0 and g>3. The composition of the resulting solution was as follows:

$Al_2O_3$: 6.31%
MgO: 3.75%
$SO_4$: 17.70%
Mg/Al: 0.75 (molar ratio), 0.68 (weight ratio)
Basicity: 34.9%

EXAMPLE 3

To a 1,500 glass beaker, 760 parts of aluminum sulfate (containing 8.3% $Al_2O_3$) were added and diluted with 110 parts water. The mixture was stirred for thirty minutes. To a second 250 ml glass beaker were added 76 parts cupric oxide (containing 98.5+% CuO), slurried with 92 parts of water. This slurried mixture was then added to the stirred diluted aluminum sulfate over fifteen minutes The mixture was heated to 60° C., continuously stirred for four hours and then cooled to 25° C. and filtered.

A reaction took place according to the following formula: (Poly CAS—33% Basic)

$$3CuO+2Al_2(SO_4)_3 \cdot 14.3H_2O+109H_2O \rightarrow 2Al_2(OH)_2{}^{4+}+Cu_3(OH)_2{}^{4+}+6SO_4{}^{2-}+134.6H_2O \quad (IX)$$

In this 33% basic solution, the numerical values were a=1, b=0.75, c=1.5, d=0, e=1.5, f=0 and g>3. The composition of the resulting solution was as follows:

$Al_2O_3$: 6.25%
CuO: 7.52%
$SO_4$: 17.8%
Cu/Al: 0.75 (molar ratio), 1.8 (weight ratio)
Basicity: 31.6%

EXAMPLE 4

To a 1,500 ml glass beaker, 760 parts of aluminum sulfate (containing 8.3% $Al_2O_3$) were added and diluted with 107 parts water. The mixture was stirred for thirty minutes. To a second 1 liter glass beaker were added 78 parts zinc oxide (containing 95.0+% ZnO), slurried with 95 parts of water. This slurried mixture was then added to the stirred diluted aluminum sulfate over fifteen minutes. The mixture was heated to 50° C. and continuously stirred for four hours and then cooled to 25° C. and filtered.

A reaction took place according to the following formula: (Poly ZAS—33% Basic)

$$3ZnO+2Al_2(SO_4)_3 \cdot 14.3H_2O+109H_2O \rightarrow 2Al_2(OH)_2{}^{4+}+Zn_3(OH)_2{}^{4+}+6SO_4{}^{2-}+134.6H_2O \quad (X)$$

In this 33% basic solution, the numerical values were a=1, b=0.75, c=1.5, d=0, e=1.5, f=0 and g>3. The composition of the resulting solution was as follows:

$Al_2O_3$: 6.35%
ZnO: 7.72%
$SO_4$: 17.9%
Zn/Al: 0.75 (molar ratio), 1.94 (weight ratio)
Basicity: 32.4%

EXAMPLE 5

To a 1,500 ml glass beaker was added 300 parts of aluminum chloride (containing 10.6% $Al_2O_3$) and this was diluted with 235 parts of water to lower % $Al_2O_3$ to below 8.3%. Then 380 parts of aluminum sulfate (containing 8.3% $Al_2O_3$) were added and the mixture was stirred for three hours. To a 250 ml beaker were added 38 parts of magnesium oxide (containing 98.5+% MgO), slurried with 47 parts of water. This slurried mixture was added to the stirred mixture of aluminum chloride, aluminum sulfate and water over fifteen minutes. The final mixture was allowed to stir for four hours and was then filtered. A reaction took place according to the following formula:
(Poly MACS 2.1CS—33% Basic)

$$3MgO+Al_2(SO_4)_3 \cdot 14.3H_2O+2AlCl_3+126H_2O \rightarrow 2Al_2(OH)_2{}^{4+}+Mg_3(OH)_2{}^{4+}+3SO_4{}^{2-}+6Cl^-+137.3H_2O \quad (XI)$$

In this 33% basic solution, the numerical values were a=1, b=0.75, c=1.5, d=1.5, e=0.75, f=0 and g>3. The resulting composition of the final mixture is as follows:

$Al_2O_3$: 6.33%
MgO: 3.75%
Cl: 6.62%
$SO_4$: 8.93%
Mg/Al: 0.76 (molar ratio), 0.67 (weight ratio)
Cl/$SO_4$: 2.00 (molar ratio), 0.74 (weight ratio)
Basicity: 34.2%

EXAMPLE 6

To a 1,500 ml glass beaker were added 355 parts of aluminum chloride (containing 10.6% $Al_2O_3$), diluted with 372 parts of water to lower % $Al_2O_3$ to below 8.3%. Then 135 parts of aluminum sulfate (containing 8.3% $Al_2O_3$) was added and the mixture was heated to 80° C. and stirred for three hours. While maintaining heat at 80°C., 15 parts of aluminum metal (containing 98.0+% Al) were added over a one hour period and the mixture was stirred at 80° C. for three hours, or until the solution became clear. The mixture was then cooled to 25° C.

In a second 250 ml glass beaker, 55 parts of magnesium oxide (containing 98.5+% MgO) was slurried with 68 parts of water. This slurried mixture was then added to the reacted mixture now containing a low basic poly aluminum chlorosulfate. The MgO slurry was added to the stirred reaction mixture over fifteen minutes, and the final mixture was stirred for four hours and was then filtered.

A reaction took place according to the following formula:
(Poly MACS 7.1CS—50% Basic)

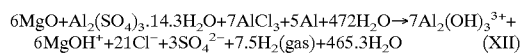
$6MgO+Al_2(SO_4)_3.14.3H_2O+7AlCl_3+5Al+472H_2O \rightarrow 7Al_2(OH)_3^{3+}+6MgOH^++21Cl^-+3SO_4^{2-}+7.5H_2(gas)+465.3H_2O$ (XII)

In this 50% basic solution, the numerical values were a=1, b=0.43, c=1.93, d=1.5, e=0.21, f=0 and g>3. The resulting composition of the final mixture is as follows:

$Al_2O_3$: 7.71%
MgO: 5.40%
Cl: 7.82%
$SO_4$: 3.17%
Al/Mg: 0.43 (molar ratio), 0.80 (weight ratio)
Cl/$SO_4$: 6.70 (molar ratio), 2.46 (weight ratio)
Basicity: 46.4%

EXAMPLE 7

To a 1,500 ml glass beaker, 760 parts of aluminum sulfate (containing 8.3% $Al_2O_3$) were added and diluted with 217 parts water. The mixture was stirred for thirty minutes. To the mixture were added 23 parts magnesium metal (containing 97.5+% Mg) over fifteen minutes under heat and stirring. The mixture was heated to 80° C. and continuously stirred for four hours and then cooled to 25° C. and filtered.

A reaction took place according to the following formula:
(Poly MAS—33% Basic)

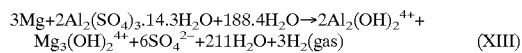
$3Mg+2Al_2(SO_4)_3.14.3H_2O+188.4H_2O \rightarrow 2Al_2(OH)_2^{4+}+Mg_3(OH)_2^{4+}+6SO_4^{2-}+211H_2O+3H_2(gas)$ (XIII)

In this 33% basic solution, the numerical values were a=1, b=0.75, c=1.5, d=0, e=1.5, f=0 and g>3. The composition of the resulting solution was as follows:

$Al_2O_3$: 6.31%
MgO: 3.72%
$SO_4$: 17.86%
Al/Mg: 0.75 (molar ratio), 0.69 (weight ratio)
Basicity: 35.2%

PERFORMANCE TESTS 1

Several of the compounds made above and commercially available compounds were tested on water from Lake Haworth, a major sources of water for Jersey City, N.J. The raw water conditions were:

Turbidity: 4.2 NTUs
Temperature: 13°C.
Alkalinity: 65 ppm
Standard Treatment: Alum 44 ppm as is, poly DADMAC (poly dimethyl diallyl ammonium chloride) 0.3 ppm.
Comparative test results are shown below in Table 1.

TABLE 1

| INORGANIC | INORGANIC DOSAGE As Is ppm | ORGANIC | ORGANIC DOSAGE As Is ppm | FLOC SIZE | FILTERED TURBIDITY NTU |
|---|---|---|---|---|---|
| Alum | 58 | | | 1 | 0.65 |
| Alum | 64 | | | 3 | 0.57 |
| Alum | 33 | DADMAC | 0.3 | Pin Point | 1.12 |
| Alum | 44 | DADMAC | 0.3 | 3 | 0.83 |
| Alum | 50 | DADMAC | 0.3 | 2 | 0.42 |
| Poly MACS 7.1CS | 15 | DADMAC | 0.3 | Pin Point | 1.12 |
| Poly MACS 7.1CS | 20 | DADMAC | 0.3 | 1 | 0.69 |
| PACS | 13 | DADMAC | 0.3 | Pin Point+ | 0.48 |
| PACS | 17 | DADMAC | 0.3 | 2 | 0.45 |
| Poly MAS | 20 | DADMAC | 0.3 | 3 | 0.35 |
| Poly MAS | 23 | DADMAC | 0.3 | 3 | 0.25 |
| Poly MAS | 26 | DADMAC | 0.3 | 3 | 0.37 |
| Poly CAS | 32 | | | 2 | 0.39 |
| Poly CAS | 45 | | | 2 | 0.44 |

The materials used in the testing are defined as follows:

Alum: Commercially available aqueous aluminum sulfate solution, 8.3% $Al_2O_3$

Poly MACS 7.1CS: Example 1, Reaction VII

Poly MAS: Example 2, Reaction VIII

Poly CAS: Example 3, Reaction IX

PACS: Commercially available product of reaction IIIA and IIIB, 10% $Al_2O_3$, 50% basic.

The Poly MAS gave the best results. Samples were also prepared where the poly DADMAC was pre-blended with the Poly MAS. The performance was similar to the results obtained above.

PERFORMANCE TESTS 2

Several of the compounds prepared above and commercially available compounds were tested on Lake Hiawatha, New Jersey water. The source is the Boonton reservoir and the main tributary is the Rockaway River. This reservoir is one of the major sources of water for Newark, N.J. The raw water conditions were:

Turbidity: 2.5 NTUs

Temperature: 7° C.

Alkalinity: 50 ppm

Standard Treatment: Alum 16 ppm and poly DADMAC 3.0 ppm.

Comparative test results are shown below in Table 2.

Poly MACS 7.1CS: Example 1, Reaction VII

Poly MAS: Example 2, Reaction VIII

Poly CAS: Example 3, Reaction IX

PACS: Commercially available product of reaction IIIA and IIIB, 10% $Al_2O_3$, 50% basic.

The commercial PACS gave the best performance followed by Poly MAS. Since the estimated preparation costs for Poly MAS are about 30% of PACS, the Poly MAS outperformed both the PACS and alum on a cost performance basis.

PERFORMANCE TESTS 3

Several of the compounds prepared above and commercially available compounds were tested on wastewater from a paper mill where 100% of the furnish is recycled paper. The wastewater has the following characteristics:

Suspended solids: 5,000 mg/l

Temperature: 13° C.

TABLE 2

| INORGANIC | INORGANIC DOSAGE As Is ppm | ORGANIC | ORGANIC DOSAGE As Is ppm | FLOC SIZE | FILTERED TURBIDITY NTU |
|---|---|---|---|---|---|
| Alum | 21 | DADMAC | 3.0 | 1 | 0.51 |
| Alum | 29 | DADMAC | 3.0 | 1 | 0.51 |
| Alum | 38 | DADMAC | 3.0 | 2 | 0.40 |
| Poly MACS 7.1CS | 12 | DADMAC | 3.0 | 1 | 0.25 |
| Poly MACS 7.1CS | 14 | DADMAC | 3.0 | 1+ | 0.36 |
| PACS | 6 | DADMAC | 3.0 | 1 | 0.31 |
| PACS | 8 | DADMAC | 3.0 | 2 | 0.2 |
| Poly MAS | 10 | DADMAC | 3.0 | 1 | 0.26 |
| Poly MAS | 13 | DADMAC | 2.5 | 1 | 0.25 |
| Poly MAS | 16 | DADMAC | 2.5 | 2 | 0.23 |
| Poly CAS | 10 | DADMAC | 3.0 | 2 | 0.34 |
| Poly CAS | 13 | DADMAC | 3.0 | 2 | 0.43 |

The materials used in the testing are defined as follows:

Alum: Commercially available liquid aluminum sulfate solution, 8.3% $Al_2O_3$

Standard Treatment: Alum 4000 ppm as is and poly DADMAC 200 ppm

Comparative test results are shown below in Table 3.

TABLE 3

| INORGANIC | INORGANIC DOSAGE As Is ppm | ORGANIC | ORGANIC DOSAGE As Is ppm | FLOC SIZE | FILTERED TURBIDITY NTU |
|---|---|---|---|---|---|
| Alum | 4000 | DADMAC | 200 | 4 | 75 |
| Alum | 3300 | DADMAC | 200 | 7 | 180 |
| Alum | 3100 | DADMAC | 200 | 10 | 300 |
| Poly MACS 7.1CS | 400 | DADMAC | 200 | 7 | 156 |
| Poly MACS 7.1CS | 600 | DADMAC | 200 | 10 | 271 |
| PACS | 300 | DADMAC | 200 | 7 | 156 |
| PACS | 500 | DADMAC | 200 | 6 | 151 |

TABLE 3-continued

| INORGANIC | INORGANIC DOSAGE As Is ppm | ORGANIC | ORGANIC DOSAGE As Is ppm | FLOC SIZE | FILTERED TURBIDITY NTU |
|---|---|---|---|---|---|
| Poly MAS | 300 | DADMAC | 200 | 10 | 277 |
| Poly MAS | 400 | DADMAC | 200 | 6 | 225 |
| Poly MAS | 500 | DADMAC | 200 | 5 | 156 |
| Poly MAS | 1000 | DADMAC | 200 | 2 | 51 |
| Poly MACS 2.1CS | 500 | DADMAC | 200 | 10 | 297 |

The materials used in the testing are defined as follows:

Alum: Commercially available liquid aluminum sulfate solution, 8.3% $Al_2O_3$

Poly MACS 7.1CS: Example 1, Reaction VII

Poly MAS: Example 2, Reaction VIII

Poly MACS 2.1CS Example 5, Reaction XI

PACS: Commercially available product of Reaction IIIA and IIIB, 10% $Al_2O_3$, 50% basic.

Poly MAS gave the best results, significantly outperforming alum and giving performance results comparable to PACS. The PACS is estimated to cost about 3 times as much as Poly MAS to produce.

In addition to the treatment of water and wastewater to coagulate, flocculate and precipitate suspended solids, the compounds of the invention may also be use for:

treatment of lake water to control phosphate and algae;

removal of oil from wastewater;

control of pitch in the paper industry;

retention and drainage in the paper industry;

sizing paper.

What is claimed is:

1. A method for treatment of water for removal of suspended solids therefrom, comprising adding to the water an effective amount of a polynucleate hydroxide ionic compound of the formula:

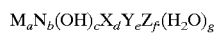

$$M_aN_b(OH)_cX_dY_eZ_f(H_2O)_g$$

wherein

M is a tri- or more valent metal ion;

N is a divalent metal ion that forms a soluble salt with anions X, Y or Z;

OH represents the level of basicity;

X is a monovalent anion;

Y is a divalent anion;

Z is a trivalent anion;

a is 1;

b is from 0.44 to 2.0;

c is from 0.3 to 5;

d is from 0 to 3;

e is from 0.1 to 2.25 f is from 0 to 1; and g is greater than 4 where the compound is in the form of an aqueous solution, or from 0 to 20 where the compound is not in the form of an aqueous solution and wherein the mole ratio of N to M is greater than 0.44 and the polynucleate metal hydroxide ionic compound coagulates, flocculates or precipitates the suspended solids from the water for removal of the coagulated, flocculated or suspended solids.

2. A method according to claim 1, wherein the water is lake water, and the treatment controls phosphate and algae in the lake water.

3. A method according to claim 1, wherein the water is reservoir water, and the treatment clarifies reservoir water.

4. A method according to claim 1, wherein the water is waste water, and the treatment removes wastes from the waste water.

5. A method according to claim 1, wherein the water is river water, and the treatment removes turbidity from the river water.

* * * * *